United States Patent
Sun

(10) Patent No.: US 9,684,117 B2
(45) Date of Patent: Jun. 20, 2017

(54) BACKLIGHT ASSEMBLY WITH BRIGHTNESS ENHANCING MECHANISM

(71) Applicant: Szu-Wei Sun, Pingzhen (TW)

(72) Inventor: Szu-Wei Sun, Pingzhen (TW)

( * ) Notice: Subject to any disclaimer, the term of this patent is extended or adjusted under 35 U.S.C. 154(b) by 240 days.

(21) Appl. No.: 14/513,256

(22) Filed: Oct. 14, 2014

(65) Prior Publication Data

US 2016/0103271 A1    Apr. 14, 2016

(51) Int. Cl.
*F21V 8/00* (2006.01)
*H01H 13/83* (2006.01)

(52) U.S. Cl.
CPC ........... *G02B 6/0055* (2013.01); *G02B 6/006* (2013.01); *G02B 6/0021* (2013.01); *H01H 13/83* (2013.01); *H01H 2219/06* (2013.01); *H01H 2219/062* (2013.01)

(58) Field of Classification Search
CPC ....... H01H 2219/044; H01H 2219/062; H01H 2219/0622; H01H 2203/052; H01H 13/83; H01H 13/88
USPC ................. 362/23.03, 23.07–23.13
See application file for complete search history.

(56) References Cited

U.S. PATENT DOCUMENTS

| | | | |
|---|---|---|---|
| 8,933,871 B2* | 1/2015 | Park | G02F 1/133603 345/102 |
| 2004/0257829 A1* | 12/2004 | Suwa | G06F 3/0202 362/555 |
| 2010/0097246 A1* | 4/2010 | Watanabe | G06F 3/0202 341/22 |
| 2014/0226302 A1* | 8/2014 | Shih | G06F 3/0202 362/23.03 |
| 2014/0233258 A1* | 8/2014 | Zhang | G02B 6/005 362/607 |
| 2014/0326589 A1* | 11/2014 | Shiu | H01H 13/83 200/5 A |
| 2014/0369067 A1* | 12/2014 | Chen | G02B 6/0021 362/606 |
| 2015/0021151 A1* | 1/2015 | Chen | H01H 13/83 200/5 A |

* cited by examiner

*Primary Examiner* — Andrew Coughlin
*Assistant Examiner* — Colin Cattanach

(57) ABSTRACT

A backlight assembly includes an upper reflective layer including a plurality of first openings; a lower reflective layer secured to the upper reflective layer; a light guide plate disposed between the upper and lower reflective layers; an opaque shading layer disposed on one surface of the upper reflective layer; and a circuit board disposed above the shading layer and including a circuit and a plurality of second openings. Light with enhanced brightness is transmitted to bottoms of keycaps of an input device of a 3C product with energy consumed to a minimum during light transmitting.

12 Claims, 6 Drawing Sheets

BACKLIGHT ASSEMBLY WITH BRIGHTNESS ENHANCING MECHANISM

BACKGROUND OF THE INVENTION

1. Field of the Invention

The invention relates to backlight assembly and, more particularly, to a backlight assembly having a brightness enhancing mechanism, so that light with enhanced brightness is transmitted to predetermined positions (i.e., bottom of keycaps of a keyboard or keypad) of a 3C (computer, communication, and consumer electronics) product with energy consumed to a minimum during light transmitting.

2. Description of Related Art

Backlight is widely used in many electronic products and lights such as keyboards, keypads, notebook computers, mobile phones, and displays. A conventional backlight assembly is comprised of a light guide layer, a reflector plate, a light shading plate and circuit board. The plates are manufactured separately prior to stacking in the manufacturing process. However, energy of the light may be lost gradually as it passes through a multi-structure consisting of the light guide plate, the reflector plate, the light shading plate and the circuit board. As such, insufficient light is transmitted to predetermined positions (i.e., bottoms of keycaps of a keyboard or keypad) of a 3C product. As a result, backlight efficiency is greatly decreased.

Thus, the need for improvement still exists.

SUMMARY OF THE INVENTION

It is therefore one object of the invention to provide a backlight assembly comprising an upper reflective layer including a plurality of first openings; a lower reflective layer secured to the upper reflective layer; a light guide plate disposed between the upper and lower reflective layers; an opaque shading layer disposed on one surface of the upper reflective layer; and a circuit board disposed above the shading layer and including a circuit and a plurality of second openings.

The above and other objects, features and advantages of the invention will become apparent from the following detailed description taken with the accompanying drawings.

DETAILED DESCRIPTION OF THE INVENTION

Figure 1:
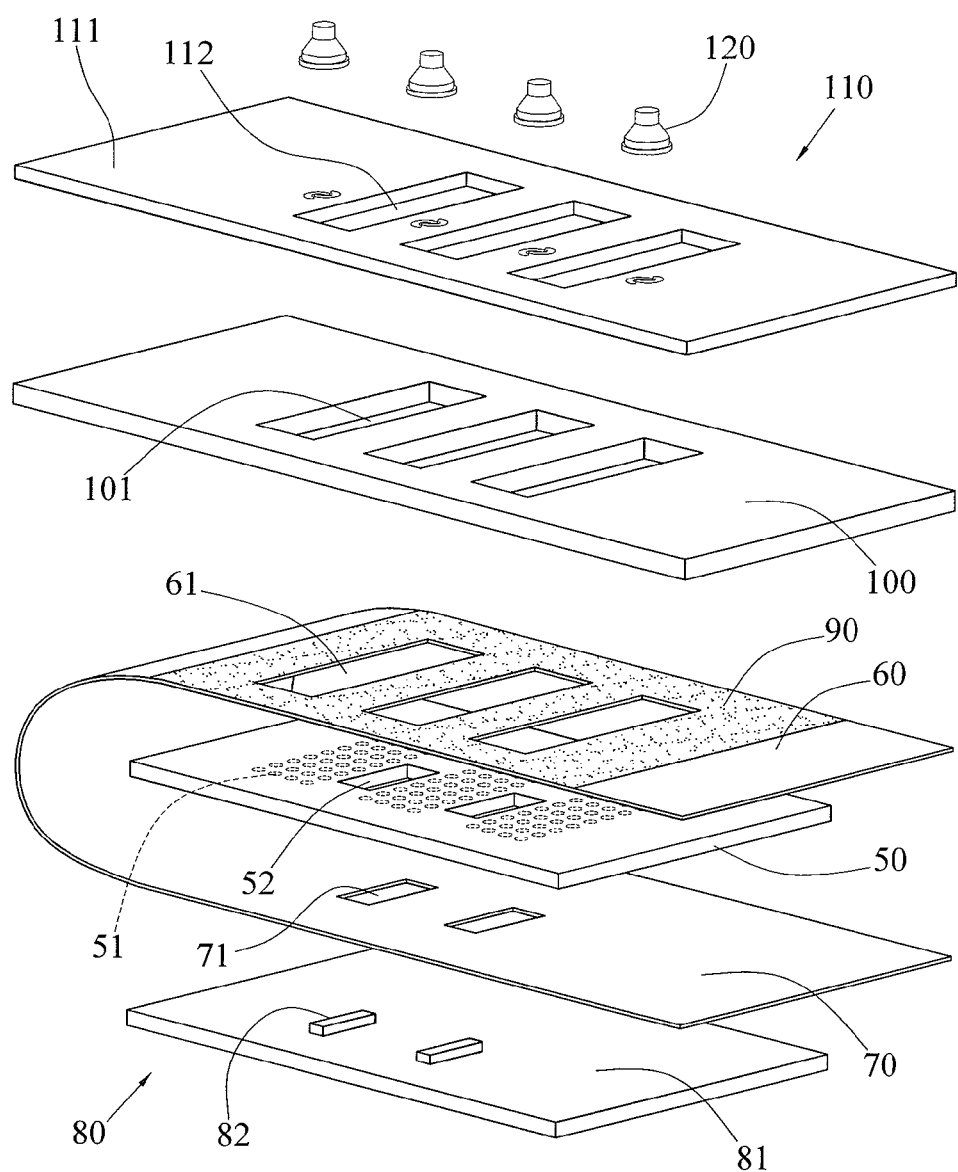
FIG. 1 is an exploded view of a backlight assembly according to a first preferred embodiment of the invention.
Figure 3:
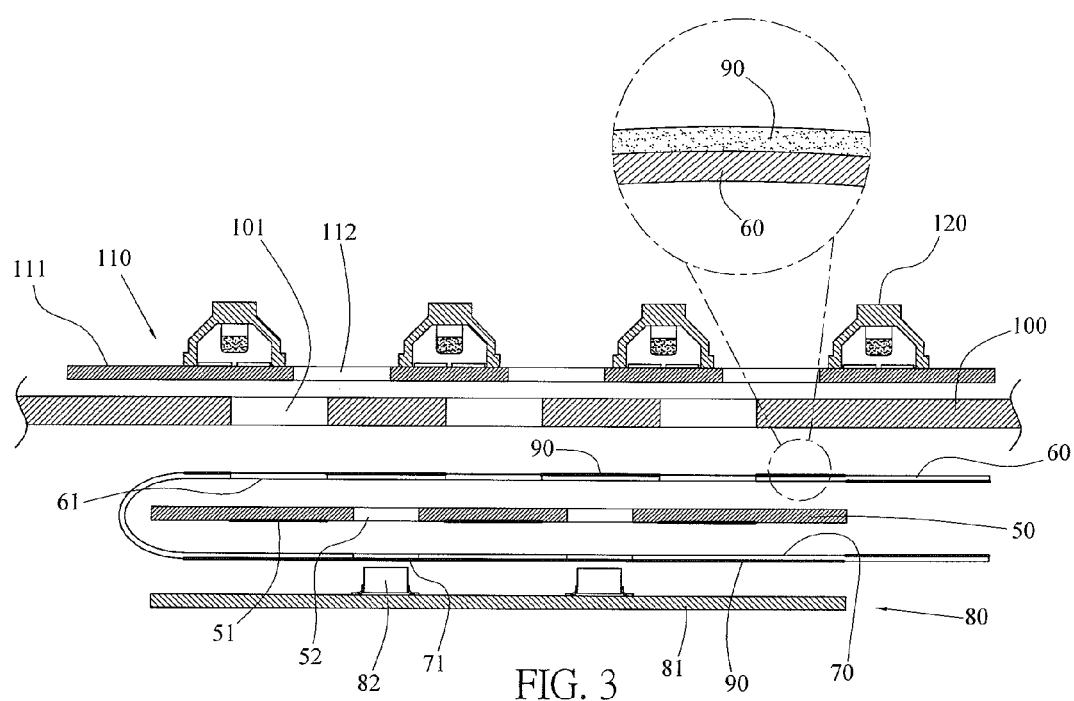
FIG. 3 is a longitudinal sectional view of the backlight assembly of FIG. 1.
Figure 4:
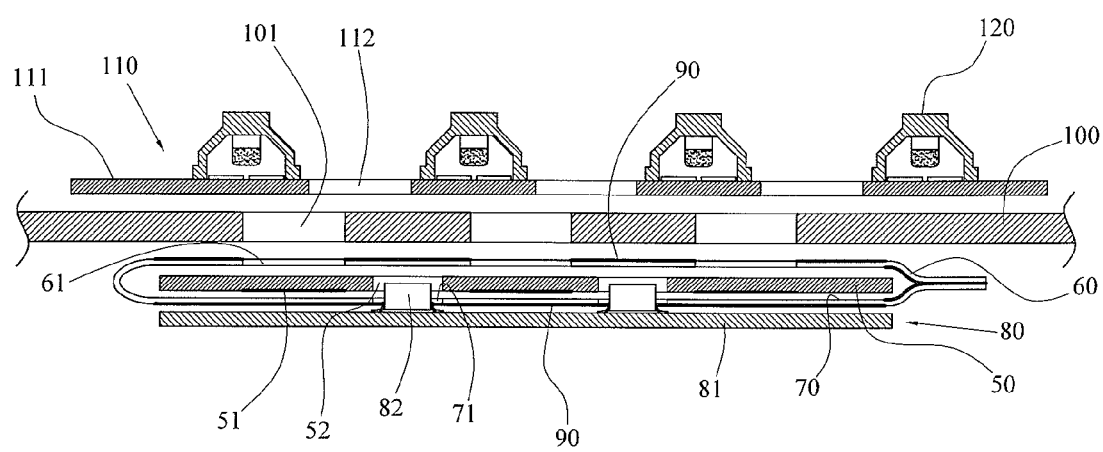
FIG. 4 is a longitudinal sectional view of the assembled backlight assembly of FIG. 1.

Referring to FIGS. 1, 3, and 4, a backlight assembly in accordance with a first preferred embodiment of the invention comprises the following components as discussed in detail below.

A light guide plate 50, an upper reflective layer 60, and a lower reflective layer 70 are provided. The upper and lower reflective layers 60, 70 are unitary and folded along an intermediate portion of the unitary upper and lower reflective layers 60, 70 to contain the light guide plate 50. Further, ends of the unitary upper and lower reflective layers 60, 70 are adhesively secured together. The upper reflective layer 60 includes a plurality of openings 61. A light source 80 includes a light emitting circuit 81 and a plurality of light-emitting diodes (LEDs) 82 formed on the light emitting circuit 81. The light source 80 is provided under the lower reflective layer 70 or the light guide plate 50. The lower reflective layer 70 includes a plurality of openings 71. The light guide plate 50 includes a plurality of openings 52. The LEDs 82 pass through the openings 71 to dispose in the openings 52. Thus, light emitted by the LEDs 82 may pass through the light guide plate 50. Further, the light travels by means of the upper and lower reflective layers 60, 70. The components of the light source 80 are for description purposes only and are not subject of the invention.

An opaque shading layer 90 is provided on a top surface of the upper reflective layer 60 and is formed by coating ink thereon. A portion or all of the top surface of the upper reflective layer 60 is formed with the shading layer 90. Further, the opaque shading layer 90 is provided on a bottom surface of the lower reflective layer 70 and is formed by coating ink thereon. A portion or all of the top surface of the upper reflective layer 60 is formed with the shading layer 90, and a portion or all of the bottom surface of the lower reflective layer 70 is formed with the shading layer 90. A support plate 100 is provided above the upper reflective layer 60 and includes a plurality of openings 101. A circuit board 110 is provided above the support plate 100 and includes a circuit 111 and a plurality of openings 112. The openings 112 and the circuit 111 are spaced apart. The openings 61 and openings 101 are aligned and communicate with each other. The openings 112, the openings 101, and the openings 61 are not aligned or communicate with each other. A plurality of elastic members 120 is provided on the circuit 111 respectively. A pressing of the elastic member 120 can short the corresponding circuit 111.

Preferably, the support plate 100 is made of metal, and the upper and lower reflective layers 60, 70 are formed by folding an intermediate portion of a reflective layer and being secured together at ends of the reflective layer, with the light guide plate 50 disposed between the upper reflective layer 60 and the lower reflective layer 70. Both the upper and lower reflective layers 60, 70 are opaque. Each of the upper and lower reflective layers 60, 70 are white, silver, or gray. The light guide plate 50 further includes a plurality of reflective areas 51 formed on a bottom surface. The reflective areas 51 are aligned with the openings 61 and openings 101. The reflective areas 51 can change direction of the light prior to passing through the openings 61 and openings 101 to reach predetermined positions (e.g., bottom of keycaps of a keyboard or keypad) for illumination. Sizes of the openings 61, 101, and 112 are not required to be the same. The provision of the shading layer 90 can prevent the light leaking.

Figure 2:
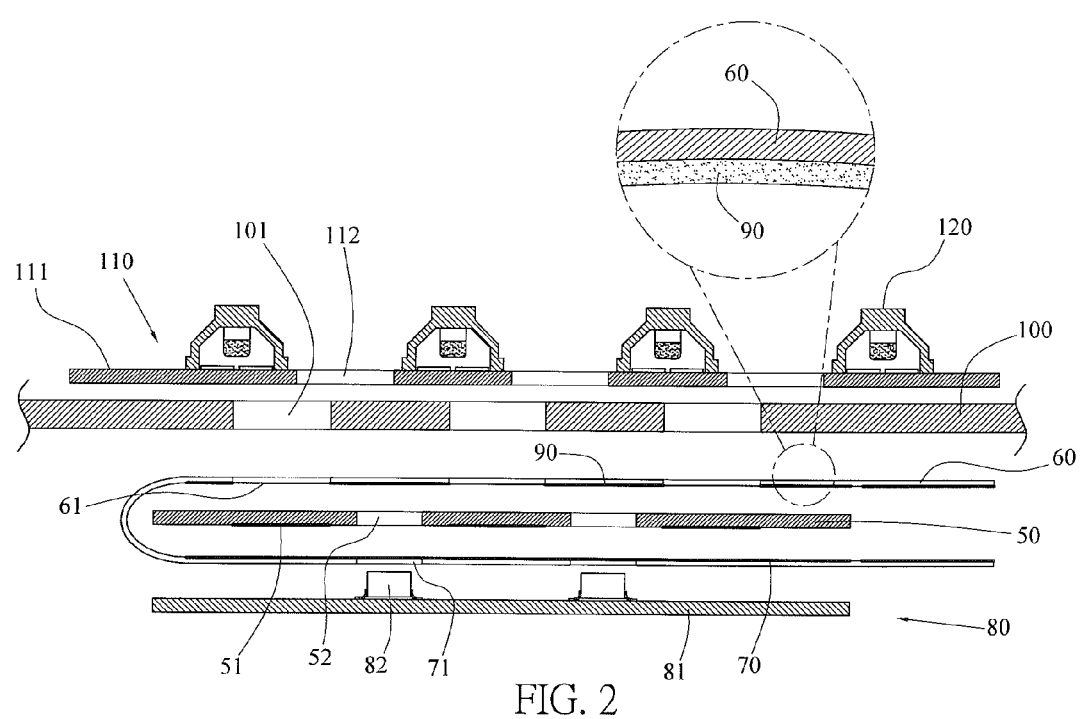
FIG. 2 is a longitudinal sectional view of a backlight assembly according to a second preferred embodiment of the invention, with the backlight assembly not assembled.

Referring to FIG. 2, a backlight assembly in accordance with a second preferred embodiment of the invention is shown. The characteristics of the second preferred embodiment are substantially the same as that of the first preferred embodiment except the following:

The opaque shading layer 90 is provided on a bottom surface of the upper reflective layer 60. A portion or all of the bottom surface of the upper reflective layer 60 is formed with the opaque shading layer 90. Further, the opaque shading layer 90 is provided on a top surface of the lower reflective layer 70. A portion or all of the top surface of the lower reflective layer 70 is formed with the shading layer 90.

Figure 5:
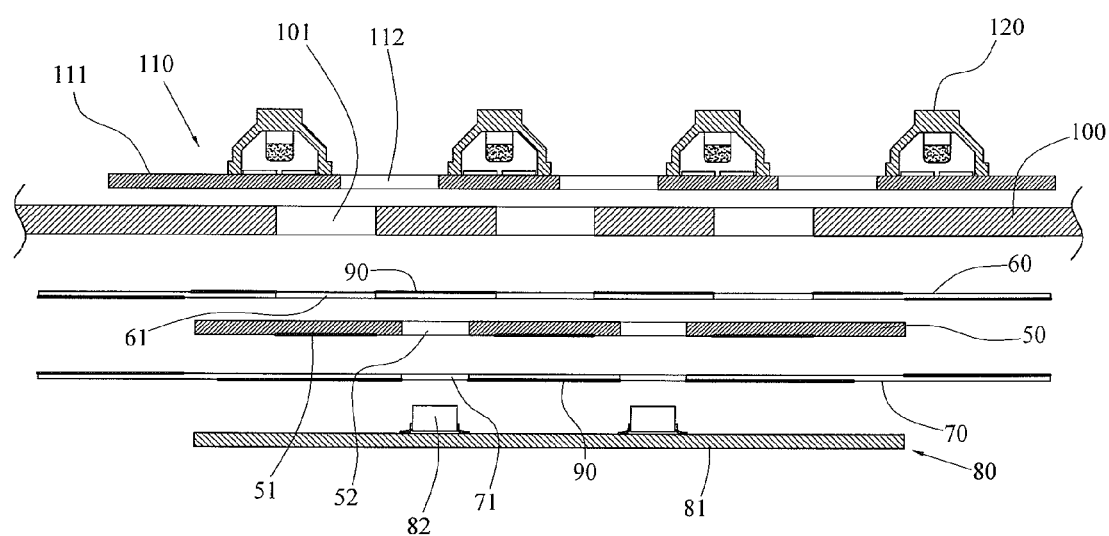
FIG. 5 is an exploded view of a backlight assembly according to a third preferred embodiment of the invention.
Figure 6:
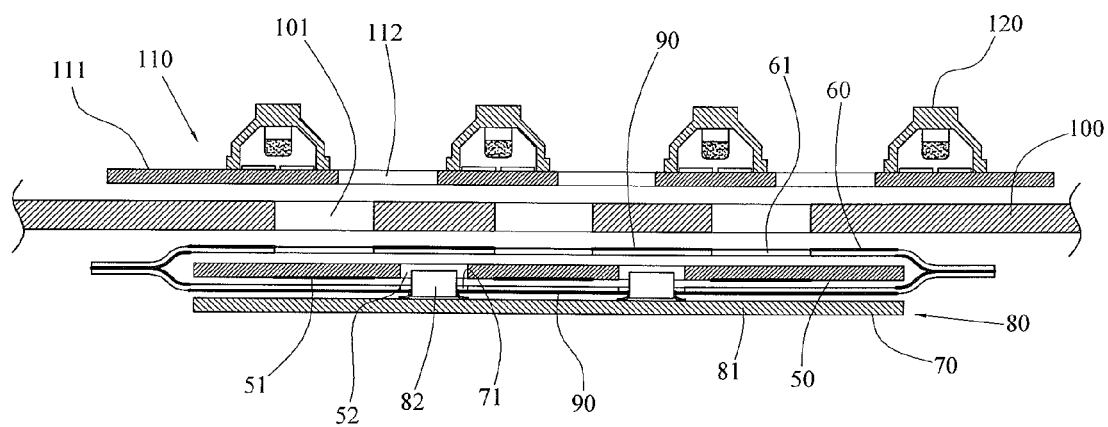
FIG. 6 is a longitudinal sectional view of the assembled backlight assembly of FIG. 5.

Referring to FIGS. 5 and 6, a backlight assembly in accordance with a third preferred embodiment of the invention is shown. The characteristics of the third preferred embodiment are substantially the same as that of the first preferred embodiment except the following:

The upper reflective layer 60 and the lower reflective layer 70 are unitary respectively. Ends of the upper and lower reflective layers 60, 70 are adhesively secured together, and the light guide plate 50 is concealed by and between the upper and lower reflective layers 60, 70.

The opaque shading layer 90 is provided on top or bottom surfaces of the upper reflective layer 60 respectively. A portion or all of the top and bottom surfaces of the upper reflective layer 60 is formed with the opaque shading layer 90. Further, the opaque shading layer 90 is provided on top and bottom surfaces of the lower reflective layer 70. A portion or all of the top or bottom surfaces of the lower reflective layer 70 is formed with the shading layer 90.

It is envisage by the invention that the light guide plate 50 can direct light through the openings 61, 101, and 112 to reach predetermined positions (e.g., bottom of keycaps of a keyboard or keypad) for illumination without being blocked by the conventional multi-layer structure. Therefore, energy loss is decreased to a minimum during light transmitting. Light with enhanced brightness is transmitted to the predetermined positions (i.e., bottom of keycaps of a keyboard or keypad) of a 3C product for illumination. Finally, the manufacturing cost is greatly decreased and energy is greatly saved.

While the invention has been described in terms of preferred embodiments, those skilled in the art will recognize that the invention can be practiced with modifications within the spirit and scope of the appended claims.

What is claimed is:

1. A backlight assembly comprising:
   an upper reflective layer including a first end, a second end opposite to the first end and a plurality of first openings;
   a lower reflective layer including a first end and a second end opposite to the first end of the lower reflective layer;
   a light guide plate disposed between the upper and lower reflective layers intermediate the first and second ends, wherein the first and second ends of the upper and lower reflective layers are unitary to each other and folded to contain the light guide plate; wherein the second ends of the upper and lower reflective layers include adhesive for being adhesively secured to each other;
   an opaque shading layer disposed on one surface of the upper reflective layer; and
   a circuit board disposed above the shading layer and including a circuit and a plurality of second openings, wherein the upper and lower reflective layers are opaque.

2. The backlight assembly of claim 1, further comprising a support plate disposed on the upper reflective layer and the shading layer, with the support plate including a plurality of third openings.

3. The backlight assembly of claim 2, wherein the plurality of first and third openings are aligned and communicate each other; and wherein the plurality of first, second and third openings are not aligned.

4. The backlight assembly of claim 1, wherein the opaque shading layer is a coating ink on a portion or all of a top surface of the upper reflective layer.

5. The backlight assembly of claim 3, further comprising a light source disposed under the lower reflective layer; wherein the light source includes a light emitting circuit and a plurality of light-emitting diodes (LEDs) formed on the light emitting circuit; wherein the lower reflective layer includes a plurality of fourth openings; and wherein the light guide plate includes a plurality of fifth openings for receiving the LEDs so that light emitted by the LEDs is configured to pass through the light guide plate and the light is further configured to travel by the upper and lower reflective layers.

6. The backlight assembly of claim 1, further comprising a second opaque shading layer of a coating ink on a portion or all of a bottom surface of the lower reflective layer.

7. The backlight assembly of claim 3, wherein sizes of the plurality of first, second, third openings are not the same.

8. The backlight assembly of claim 1, wherein the upper reflective layer further includes another surface opposite to the one surface and intermediate the light guide plate and the one surface, with the opaque shading layer spaced from the other surface of the upper reflective layer.

9. The backlight assembly of claim 1, wherein each of the upper and lower reflective layers are white, silver, or gray.

10. The backlight assembly of claim 2, wherein each of the upper and lower reflective layers are white, silver, or gray.

11. The backlight assembly of claim 1, further comprising a plurality of elastic members disposed on the circuit respectively, and wherein pressing of one of the plurality of elastic member shorts a corresponding portion of the circuit.

12. The backlight assembly of claim 2, wherein the light guide plate includes a plurality of reflective areas formed on a bottom surface, with the reflective areas aligned with the plurality of first and third openings.

\* \* \* \* \*